United States Patent [19]

Doria Iriarte

[11] Patent Number: 5,449,136

[45] Date of Patent: Sep. 12, 1995

[54] FAIRING FOR OBTAINING STEADY STABILIZATION EFFECTS

[76] Inventor: José J. Doria Iriarte, Rodríguez Arias, 61-10, 48013 Bilbao (Vizcaya), Spain

[21] Appl. No.: 201,637

[22] Filed: Feb. 25, 1994

[30] Foreign Application Priority Data

Feb. 25, 1993 [ES] Spain .................................. 9300372

[51] Int. Cl.⁶ ..................... B64C 23/06; B64C 1/38
[52] U.S. Cl. ..................... 244/199; 244/200; 244/130
[58] Field of Search ............. 244/199, 200, 204, 130

[56] References Cited

U.S. PATENT DOCUMENTS

| | | | |
|---|---|---|---|
| 2,894,703 | 7/1959 | Hazen et al. | 244/199 |
| 2,899,150 | 8/1959 | Ellis, Jr. | 244/200 |
| 3,523,661 | 8/1970 | Rethorst | 244/199 |
| 4,671,474 | 6/1987 | Haslund | 244/199 |
| 4,736,912 | 4/1988 | Loebert | 244/200 |
| 4,776,535 | 10/1988 | Paterson et al. | 244/199 |
| 4,813,635 | 3/1989 | Paterson et al. | 244/199 |
| 4,907,765 | 3/1990 | Hirschel et al. | 244/200 |
| 5,108,145 | 4/1992 | Harris | 296/180.1 |
| 5,171,623 | 12/1992 | Yee | 244/130 |
| 5,289,997 | 3/1994 | Harris | 244/200 |

Primary Examiner—Andres Kashnikow
Assistant Examiner—Virna Lissi Mojica
Attorney, Agent, or Firm—Ostrolenk, Faber, Gerb & Soffen

[57] ABSTRACT

A fairing for providing vortex stabilization effects to a solid submerged in a fluid with relative movement thereof between the solid and the fluid. A cavity is provided in the fairing for retaining a captive fluid formed at the cavity by the relative movement between the solid and the fluid. The cavity prevents displacement of the captive fluid from the cavity to thereby provide vortex stabilization effects to the solid.

4 Claims, 2 Drawing Sheets

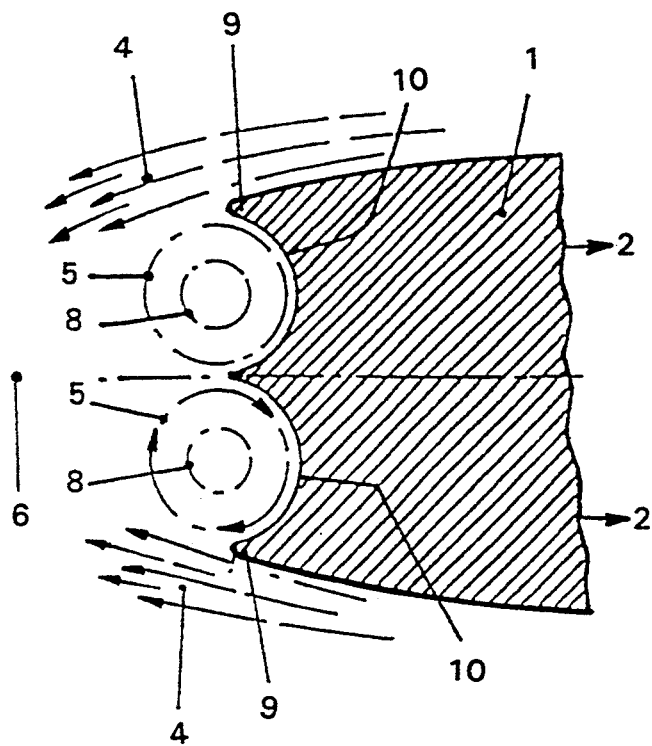
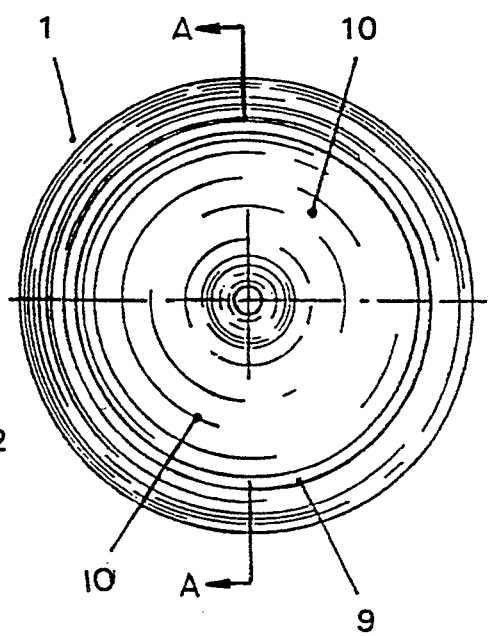
FIG. 3  FIG. 4
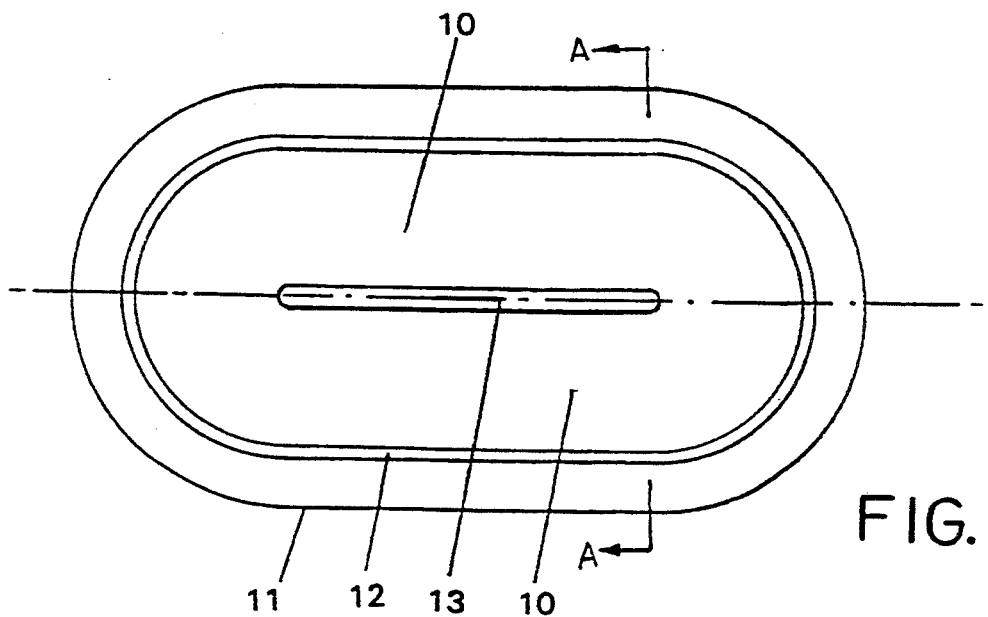
FIG. 5

FAIRING FOR OBTAINING STEADY STABILIZATION EFFECTS

OBJECT OF THE INVENTION

The fields of use may differ greatly, ranging from aeronautics, through navigation, and going to automotion, without leaving out of consideration any problem of a technical nature, in which there is included the fact that a solid body is submerged in any fluid, with relative movement.

BACKGROUND OF THE INVENTION

The applicant is the owner of the patent of invention bearing the application number 8803135.

On the technical plane, the following may be mentioned:

D'ALEMBERT'S PARADOX

A cylinder will move in an ideal fluid without experiencing any resistance.

Considering an ideal fluid one whose viscosity is "0". But taking water and air as the two fluids of greatest importance in technology which are of VERY LOW VISCOSITY, in actual fact they offer GREAT RESISTANCE to a moving cylinder.

PRANDTL'S THEORY

Which took into account the content of D'Alembert's paradox and the two concepts which result from it with respect to fluid mechanics, namely:

The boundary layer, and the detachment of the boundary layer.

As early as 1904, Prandtl, in his first work on the "boundary layer," artificially MODIFIED the layer, which modification was obtained by various methods. A general summary of the present state of the research on this matter is contained in the book BOUNDARY LAYER AND FLOW CONTROL edited by G. V. Lachmann.

THE VON KARMAN VORTICES

The observation refers to what occurs in the wake of a slightly faired solid which moves within a fluid, or, the solid being in static position, it is the fluid which moves.

Von Karman noted that the vortices DETACH THEMSELVES leaving a wake. This wake is known by the name of a "Von Karman vortex street".

DESCRIPTION OF THE INVENTION

With respect to the object of the invention: IMPROVED FAIRING, with the improvements.

TO OBTAIN VORTEX STABILIZATION EFFECTS

There is then obvious what it is attempted to obtain with the content of the present invention, namely:

In the case of a solid submerged in the stream of a fluid, to improve the fluid-dynamic conditions thereof.

For this, the solid in question is imparted a short rear fairing or truncated fairing.

Which fairing will be designed in such a way that with it there is avoided to a maximum the effects of drag and the vibrations which are produced by the fluid which has detached from the surface of the solid in question.

Then, finally, there is a question of claiming a given FAIRING arrangement which, on basis of certain principles, makes it possible to achieve the purpose desired.

THEORETICAL BASES

In order to arrive at a practical structural shaping applicable to the improved fairing, a series of steps are given, always based on certain theoretical bases.

Since in Patent 8803135 in Spain, shapes were analyzed to obtain the following:

Decrease the drag force, and also shapes for decreasing the vibrations resulting from the fluid upon its detachment.

At the present time, it is accepted as normal that there is detachment of the fluid vein and that this is due to the nonexistence of "NON-VISCOUS" fluids. A "NON-VISCOUS" fluid does not exist.

In the same way, it is agreed that in the "BOUNDARY LAYER" certain effects, certain phenomena are produced which have the result that the fluid vein detaches from the solid surface, which phenomena would not take place if the viscosity were "0".

As a result, this "DETACHMENT" is the cause of the "AERODYNAMIC DRAG".

On our part, we do not deny that the viscosity has these harmful influences, but we furthermore add that THE DETACHMENT IS INEVITABLE, even with an ideally "NON-VISCOUS" in addition to non-compressible fluid, provided that the solid is UNSUITABLY FAIRED.

Therefore, an unfaired, slightly faired or deficiently faired solid, even in an ideal fluid, inevitably causes the detachment of the fluid.

All of the foregoing leads us to certain conclusions which form the basis for the obtaining of the IMPROVED FAIRING design.

Our conclusion is:

Trying to maintain the fluid attached to the solid, trying to avoid the detachment of the fluid vein, does not always have a reduction in drag as practical result.

We base this conclusion on the following:

The aerodynamic detachment is due to an excess of curvature (very small radii) in the solid.

In the rear fairing, when there are large curvatures (small radii) high centrifugal forces are generated (low pressures and high velocities) and this necessarily leads to a large increase in the cross section of the fluid vein, which thereby increases the mass flow, with the result that in this way the Principle of Continuity is not complied with since the constancy or permanence of the mass flow is not maintained.

We realize that it is not always possible to smooth a curve in the design of a fairing, and that it is not always possible to design a longer fairing since the characteristics of the solid with respect to its specific application prevent this.

For all of these reasons, we center the application of this invention on those cases in which it is possible to effect a truncating of the theoretical fairing, seeking in this way to have the INEXORABLY DETACHED FLUID cause the least dynamic damage to the solid, in this way introducing a concept of a practical nature namely a FAIRING FOR THE DETACHED FLUID.

Up to this time, there has not been taken into account the existence of another phenomenon which in no way must be disregarded in the study with which we are concerned, namely: The existence of vortices creating turbulences.

It is not easy to define a turbulence. There is frequently adopted, as definition of turbulence, an irregular stream within the main flow. This definition is very descriptive, but we wonder how can these streams be individually within an ideal fluid.

Taking this into account, we consider the following to be a better definition:

Turbulence is what is created by a portion of fluid having great kinetic energy with respect to the uniform flow within which it is confined, there not being any discontinuity of pressure on the separating surface between the two masses.

The bases for this definition rest on the fact that it is possible for a solid to have its own kinetic energy within an ideal fluid without energy of the latter being changed. THERE ALSO CONTINUES TO BE POSSIBLE the existence of a fluid mass having its own kinetic energy, within another mass of stationary fluid.

In such case, it is logical to believe that, in order for the energized mass to be maintained confined without any flow with the rest of the fluid, THERE MUST EXIST A SEPARATION WITH IDENTICAL PRESSURE ON BOTH FACES IN CONTACT.

Which makes it necessary to presume an identical velocity in both faces or a sliding WITHOUT FRICTION in captive cores.

Accepting this definition of turbulence and passing to the reality of the phenomenon, what can be said to be certain is the result which we observe upon experimentation, namely:

When we have a slightly faired solid submerged in the stream of a fluid, vortices are produced in the rear part of this solid, which vortices are those already described by VON KARMAN and are the consequence of the DETACHMENT of said vortices, said detachments producing a wake known by his name.

This observation is reflected diagrammatically in FIG. 1.

1. Is a body of revolution which is shown by way of example. The figure simply shows a cross section produced along the line A—A in FIG. 4. This body moves in the direction indicated by 2 within a fluid, and this body is only slightly faired, as shown by the surface 3.

4. Detached flow which slides with constant pressure when the body 1 moves in the direction 2.

5. Flow which, in principle, is captive but actually does not remain this way since there are forces of friction produced by 4 and also taking into account the viscosity of the fluid. This flow, which, in principle, would be captive, would have a movement of rotation which is precisely what specifically determines the vortex. Therefore in this figure there is noted the formation of the vortex. This vortex then detaches. This detachment will cause the turbulence in the zone 6 already commented on above.

But continuing to go deeper into the theory set forth, we believe that it is necessary to point out a new observation, which is that shown in FIG. 2.

This vortex 5 has generated the formation of an internal core 8 which will also be captive. In view of the fact that what is shown in this figure is a simple cross section, and that this cross section is one of the many which can be obtained from the rear part of the solid 1, actually we are faced with a cross section of a vortex which as a whole would determine a toroidal figure, of which figure we could specify:

On the one hand, a toroidal figure one of the sections of which is indicated by 5.

Within it there would be a captive core of fluid 8 in uniform flow at a pressure less than on the outside.

This captive fluid 8 forming another toroidal figure.

Between the two toroids 5 and 8 the fluid 7 will be kept rotating.

This phenomenon, shown in FIGS. 1 and 2, is valid for any solid 1 in which there are the detachments indicated by 4. It has been pointed out that within the cores 5 there are generated vortices 7 of low pressure as compared with other external streams (in a similar phenomenon, the atmospheric process of tempests), said cores giving rise to other transverse streams which also can close upon themselves toroidally. The cores 7 which are generated grow and increase in diameter until converted into the cores 5, deforming with their growth the surface of the detachments layers 4 and in this way generating other new aerodynamics which permit their detachment, in this way forming the known, visible wandering vortices which under certain conditions are known as VON KARMAN streets, characterized precisely by their alternation. This alternation is due precisely to a sort of "flag" effect by which, upon detachment of a mass on one side, it deforms the other layer by suction, causing the detachment to be alternate.

It should be pointed out that, at the same time as the growth of these cores 5, there are generated other internal cores 7 which are fed in their mass and maintain a helicoidal trajectory around the captive core 6. Having pointed out already the formation of these vortices and the process employed for this, we believe that they have the following dynamic properties on the solid.

From the diagram of FIGS. 1 and 2, we see that these vortices 5 rest initially on the solid 1 on the surface of the fairing 3 and condition the pressure on it.

They are fed in mass and energy by the detached fluid 4. There being a transmission of the amount of movement from the detached layer 4 to the captive cores 5.

They generate new internal cores 7, which grow.

They collide and are torn away by the drag force of the detached flow 4, the pressures of various zones alternating unfavorably, including front zones of the solid.

These rhythmic alternations, caused by the successive collisions and detachments give rise to the vibrations which are also experienced by the solid.

The cores 7, upon their growth in diameter, are fed coaxially around the core 8 which is in steady flow.

After having described the theoretical bases on which the invention is based, and after having indicated the result of our research, the time now comes to take advantage of everything described in order to define a design of IMPROVED FAIRING, in order obtain STABILIZATION EFFECTS OF THE VORTICES.

The manner of application of the fairings may vary greatly, all depending on the object which the application is to achieve.

The fairing which is defined in the present invention, requires the following: (see FIGS. 3 and 4):

The existence of an EDGE 9 which in some way continuously surrounds the entire contour of the fairing, even admitting the elimination of lateral connections, when the fairing is lengthened.

Immediately on the inside of said EDGE 9 there is seen the existence of an ADJACENT CAVITY 10 which, as a whole, is A CONTINUOUS CAVITY, CLOSED ON ITSELF, which will be adapted to the shape of the EDGE 9.

The purpose of this CAVITY 10 being to permit the containing of the captive fluid 5 and to avoid the possibility of said captive fluid 5 detaching and being fed in energy and in mass.

Therefore, the cavity 10, will be ample, without protrusions or roughnesses, so as not to affect the free rotation of the captive core 5.

The order of the curvature will be substantially close to that of a circumferential arc but of great amplitude, in order to define a deep cavity so as to contain and retain the rotating core.

When, for reasons of the shape of the solid to which the fairing is applied, it is necessary to approach relatively elongated shapes 11, as shown in FIG. 5, there will appear in the inner part between the cavities 10 a ribbing 13 which in some of the cross sections of the fairing complements the principle already established.

In this way, with this ample housing or cavity 10 and taking into account the fact that the edges 9 or 12, depending on what the shape of the FAIRING is, surround the entire contour of the fairing, thereby obtaining a CONTROL and A DYNAMIC UTILIZATION in its entirety of the ZONE OF APPLICATION, particularly the zone where the detachments 4 take place, since the retention of the CAPTIVE CORE 5 is obtained with greater effectiveness.

Even when there are concerned designs of greatly elongated bodies such as the wing of an airplane (for example) may be, it may be possible to eliminate the lateral connections of the cavities 10, obtaining, despite this elimination, the same beneficial effects, provided that in the rest of this wing profile the TWO CAVITIES 10 are maintained along the entire length of the fairing, receiving and retaining the CAPTIVE CORES 5.

The advantages obtained are the following (referring to FIG. 3):

There is obtained a separation between the layer 4 of the detached fluid from the mass which we desire to remain captive 5, this separation being obtained in such a manner that the transmission of the mass and energy from the outer layer 4 to the captive mass 5 decreases substantially.

For said reason, the transfer of kinetic energy from the fluid mass 4 near the outer surface of the solid 1 decreases and for this reason the drag force DECREASES.

The detachment of the captive masses 5 near the leeward surface of the solid 1 decreases in this way avoiding the vibrations.

By the design, the result is obtained that the captive fluid mass 5 is contained in an ample capture zone 10 between the body of the solid 1 and the outer zone of possible turbulences 6, thereby obtaining a substantial damping of its effects on the solid and, in any event, keeping away from the body of the solid 1 the problem of violent detachments, due to the stable insertion which is obtained by the cavities 10.

Any sliding flow which is caused on a part of the concave surface 10 exerts a component of centrifugal pressure with positive effects, since in any case it reduces the effects of the fluid-dynamic drag promoted by the detachment 4.

Due to everything that has been pointed out above, the aerodynamic drag forces and the generation of vibrations are decreased.

DESCRIPTION OF THE DRAWINGS

In order to supplement the description which is being given, and in order to assist in a better understanding of the characteristics of the invention, the present specification is accompanied, as an integral part of it, by a set of drawings in which the following has been shown by way of illustration and not of limitation:

FIG. 3 is a figure to show in practical manner the formation of a fairing in a form suitable to achieve the benefits desired. It is unimportant in order to obtain the desired effects whether the fairing design is provided on the body 1 or whether there be concerned an attached part.

FIG. 4 is a front view, showing the place where the fairing is applied. This is a view in the event that the solid body 1 is a body of revolution. In said figure there has been indicated the cross section A—A which is the section which gives rise to FIGS. 1, 2 or 3.

FIG. 5 is a front view of the place of application of a fairing. It is a view given by way of example in order in this way to see that the housings or cavities 10 determine a continuous cavity but of elongated shape. If this figure were to show a greater length, as the front view of an airplane wing (for example) might be, then the continuous cavity 10 could be interrupted at its ends, leaving simply two cavities separated by a central rib 13 but retaining the same shape of the cross section produced by A—A.

All of these are simple manners of practical application of the invention which have served both as explanation which supports the theory applied to the NEW FAIRING and for an assumed real application of the principles which result therefrom, and in no way presuppose a limitation of any type from what is set forth in the claims. Having said this, the content of the invention can be reduced to practice in various ways:

By molding the cavities 10 on the solid itself.

By producing accessories having the cavities which can be suitably applied and fastened to the solid.

The possibility that, instead of being one continuous cavity 10 closed on itself, it may in some cases be interrupted the side parts.

EXPLANATION OF THE INVENTION, with respect to the arrangement of the different parts as they are to be claimed. Without losing sight of the SINGLE nature of the invention.

Figure 1:
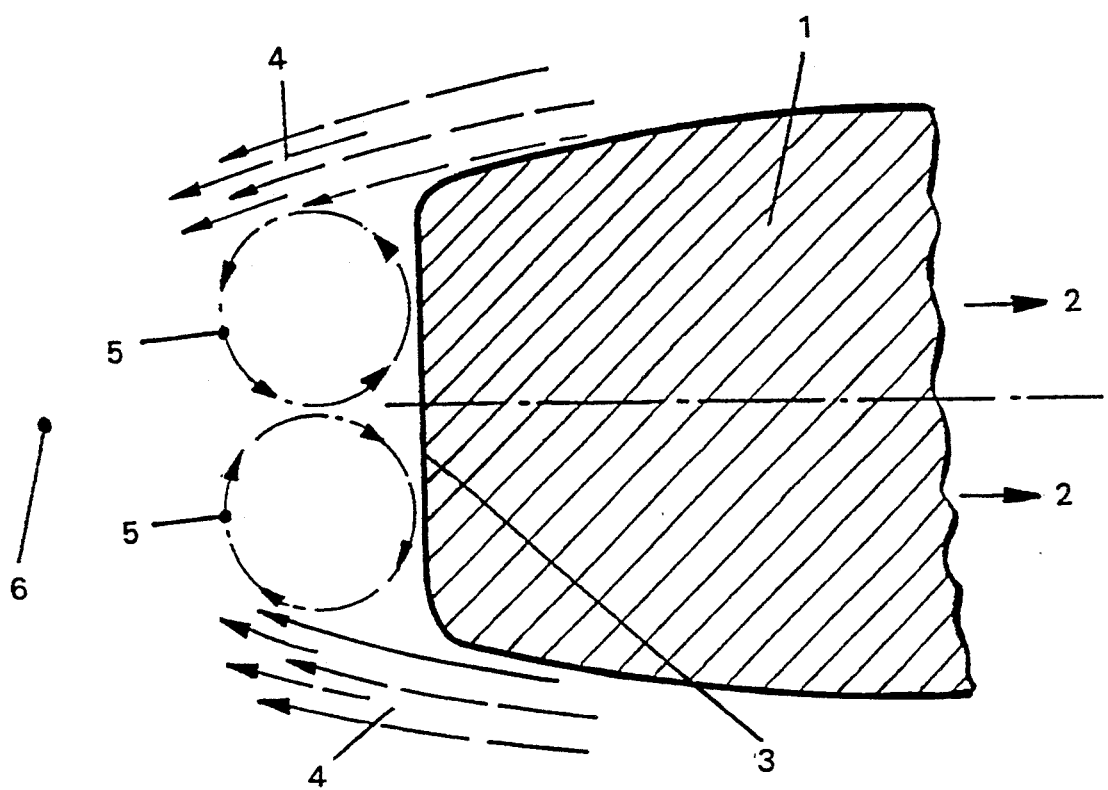
FIG. 1 serves to show diagrammatically what takes place in a cross section produced in a solid 1 which is a body of revolution. In said cross section, there has been shown by 3 the rear face of the solid which presumes an example of a blunted fairing. There is indicated by 2 an assumed movement of displacement which the solid 1 experiences within a fluid. There can be noted the formation of two zones 4 of detachment and accordingly the formation of vortices 5 resting on the blunted fairing 3. In said figure there has been shown the zone 6 which is the rear zone where the turbulences take place.
Figure 2:
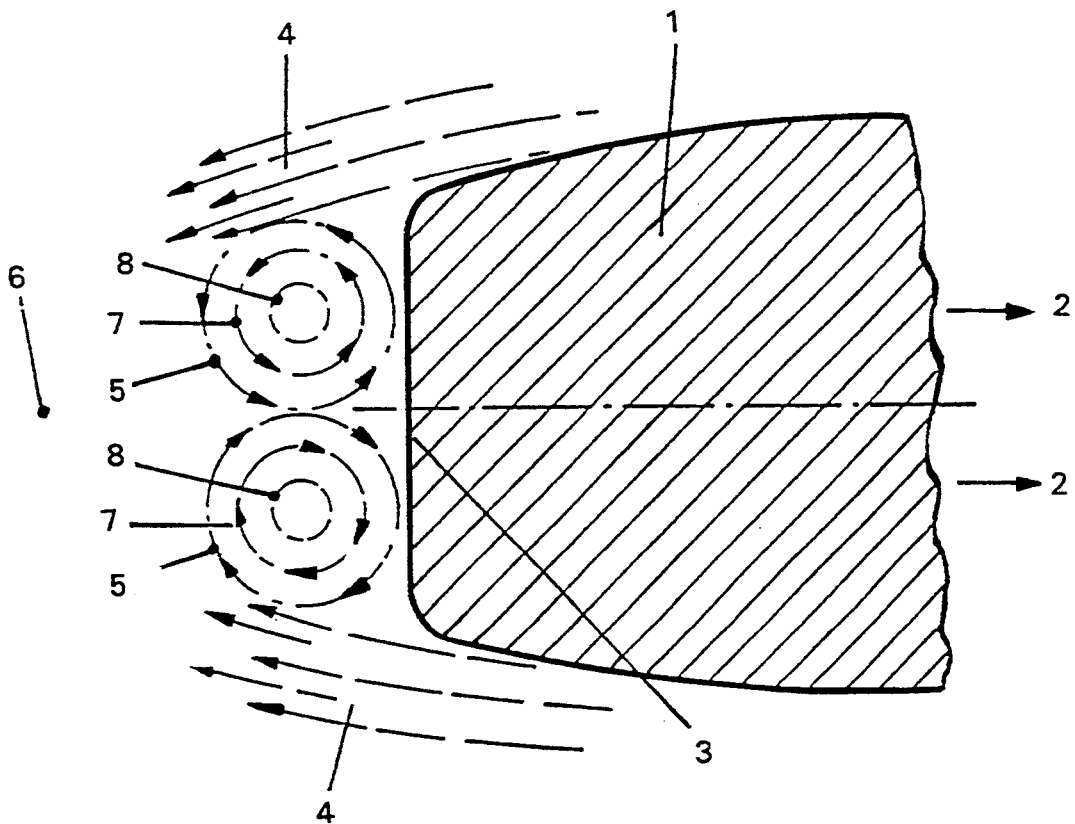
FIG. 2 is the same figure as the preceding one, there being indicated and shown the formation of a captive core of fluid 8 and there being indicated individual vortices 7 which are maintained between 5 and 8.

1. A solid body of revolution, as shown in FIG. 4.
2. It is assumed that the solid 1 the cross section of which along A—A may be any of those shown in FIGS. 1, 2 or 3, is moving within a fluid in the direction 2; this is the way in which the phenomena have been studied.

3. Rear part of the solid 1. It represents a slightly faired termination.

4. Detached flow which slides with constant pressure when the solid 1 moves within a fluid in the direction 2.

5. Flow which is captive. In its entirety it constitutes a toroidal form which, in the case of FIGS. 1 and 2, rests on the surface of the fairing 3. In the case of the practical application of the principles which is shown in FIG. 3, this flow is captive within the cavities 10 which constitute the improved fairing forming the object of the patent.

6. Rear part which is in the movement of the solid 1, in which part the turbulences are caused.

7. Vortices which are generated between the cores 5 and the inside 8.

8. Fluid which is captive within the vortex 5 with a pressure less than on the outside.

9. Edge which in some way continuously surrounds the entire contour of the fairing. At this edge there will directly start the cavity 10 which is to retain the vortex 5.

10. Ample cavities which will serve has housing for the vortices 5 which, by their continuity, can form a part for housing toroidal figures.

11. Possible body which is not a body of revolution but which is constituted in a more or less elongated shape. It is shown in order to indicate the possible application of the invention.

12. Edge of the same characteristics as 9, which also will surround the entire contour of the fairing.

13. Separating rib which is formed between the cavities in the case of substantially elongated bodies 11.

I claim:

1. A fairing for providing vortex stabilization effects to a solid submerged in a fluid with relative movement thereof between the solid and the fluid, the fairing comprising:

at least one cavity means for retaining a captive fluid formed at the cavity means by the relative movement between the solid and the fluid, the cavity means preventing displacement of the captive fluid from the cavity means to thereby provide vortex stabilization effects to the solid, said cavity means being structured and arranged at an edge of a surface of the solid over which the fluid passes, and the edge extending around a contour of the fairing in a continuous manner.

2. A fairing for providing vortex stabilization effects to a solid submerged in a fluid with relative movement thereof between the solid and the fluid, the fairing comprising:

at least one cavity means for retaining a captive fluid formed at the cavity means by the relative movement between the solid and the fluid, the cavity means preventing displacement of the captive fluid from the cavity means, said cavity means being structured and arranged at an edge of a surface of the solid over which the fluid passes, and the edge extending around a contour of the fairing in a continuous manner, wherein the fairing has an elongated shape, and the continuity of the edge is interrupted at two ends of the elongated fairing.

3. A fairing for providing vortex stabilization effects to a solid submerged in a fluid with relative movement thereof between the solid and the fluid, the fairing comprising:

two adjacent cavity means for retaining a captive fluid formed at the cavity means by the relative movement between the solid and the fluid, the cavity means preventing displacement of the captive fluid from the cavity means, the two adjacent cavity means being separated by a narrow rib, said cavity means extending substantially over an entire surface of the fairing, said cavity means being structured and arranged at an edge of a surface of the solid over which the fluid passes, and the edge extending around a contour of the fairing in a continuous manner.

4. The fairing in accordance with claim 1, wherein the cavity means is a substantially semi-circular cavity structured and arranged for containing and retaining a rotatory core of the captive fluid, a surface of the cavity having no protrusions or roughnesses so as not to affect free rotation of said captive core.

* * * * *